BANDWIDTH REDUCTION SYSTEM FOR TELEVISION SIGNALS

Filed March 24, 1958 3 Sheets-Sheet 1

INVENTOR.
WILLIAM F. SCHREIBER
BY
Lyon & Lyon
ATTORNEYS

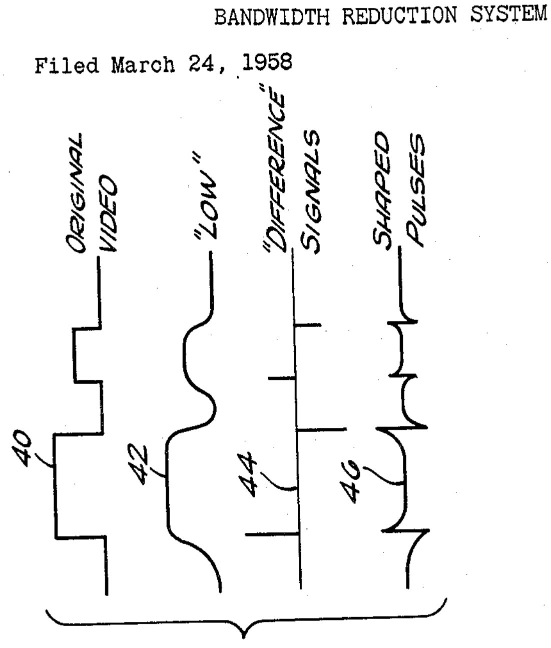
FIG. 4.
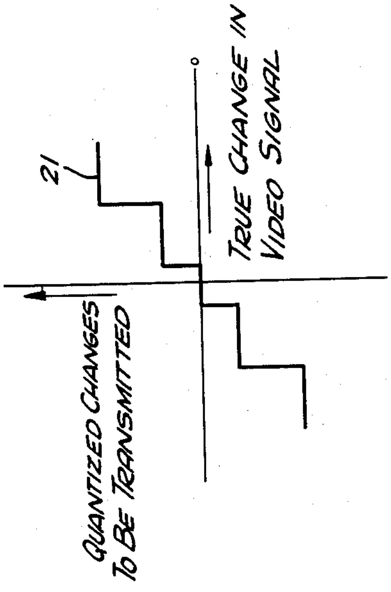
FIG. 3.
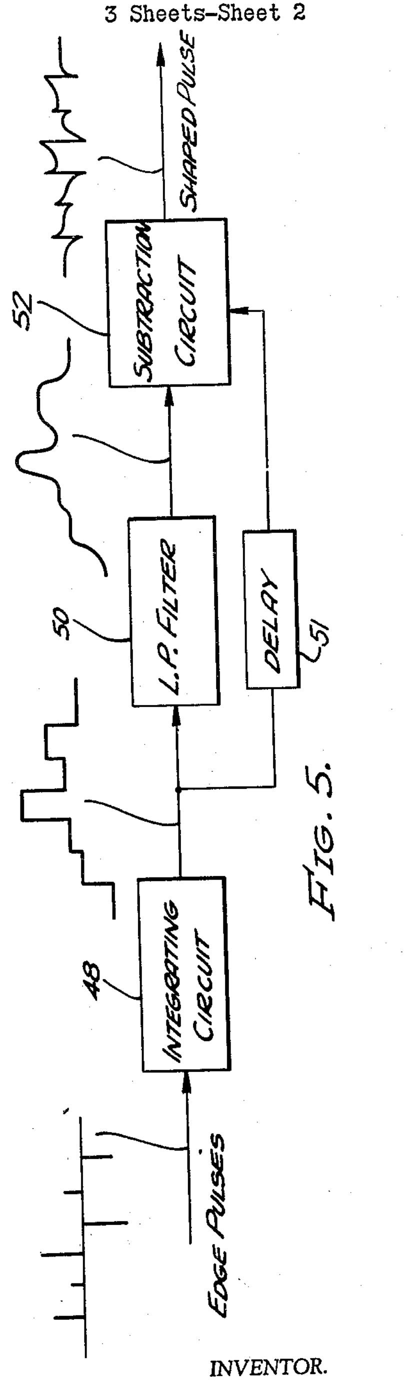
INVENTOR.
WILLIAM F. SCHREIBER
BY Lyon & Lyon
ATTORNEYS Jan. 16, 1962 W. F. SCHREIBER 3,017,456

BANDWIDTH REDUCTION SYSTEM FOR TELEVISION SIGNALS

Filed March 24, 1958 3 Sheets-Sheet 3

INVENTOR.
WILLIAM F. SCHREIBER
BY Lyon & Lyon
ATTORNEYS

United States Patent Office 3,017,456

Patented Jan. 16, 1962

3,017,456

BANDWIDTH REDUCTION SYSTEM FOR TELEVISION SIGNALS

William F. Schreiber, Los Angeles, Calif., assignor to Technicolor Corporation, Hollywood, Calif., a corporation of Maine Filed Mar. 24, 1958, Ser. No. 723,286
15 Claims. (Cl. 178—6)

This invention relates to bandwidth reduction systems and more particularly to improvements in systems for reducing the bandwidth required for the transmission of video signals.

In an article published in the "Institute of Radio Engineer's Convention Record for 1956," Part IV, by E. R. Kretzmer, entitled "Reduced-Alphabet Representation of TV Signals," a bandwidth reduction system is described wherein the low-frequency components of the video signal (below one-half megacycle) are separated from the high-frequency components. The low-frequency components are then digitalized using pulse-code modulation techniques wherein 128 levels are employed. The high-frequency components are also digitalized using a pulse-code modulation technique employing a five-level non-linear quantization in the process. Both digitalized signals can then be transmitted and reconstituted at the receiver. A factor of 2 bandwidth reduction is obtained. However, the resulting reconstituted picture has a sufficient degradation of quality so that it is not commercially satisfactory.

An object of the present invention is to provide a system of the type where separation of low and high-frequency portions of a video signal for transmission is performed wherein upon reconstitution at a receiver a commercially satisfactory picture is obtainable.

A further object of the present invention is to provide a system of the type wherein separation of low- and high-frequency portions of a video signal is performed for transmission wherein greater bandwidth reduction is obtainable.

Still another object of the present invention is to provide a novel and useful transmission system for signals having video signal characteristics.

These and other objects of the present invention are achieved in an arrangement whereby at a transmitter, the television signal is passed through a low-pass filter to separate the continuous tone "lows" signal from the remainder. This may be transmitted either directly in the normal manner or by quantizing in the manner described in the Kretzmer article. Also, the position and amplitude of changes in the video signal are suitably quantized and then transmitted. It should be noted that the quantization process which is performed using this invention is not a quantization of the highs as described in the Kretzmer article, but of the cell-to-cell, or picture-element-to-picture-element, difference signal.

A receiver in this system is equipped to receive both the continuous tone "lows" signal as well as the quantized information related to the "highs." This is reconstituted at the receiver as a difference signal. This difference signal is then passed through circuitry for giving it a wave shape so that when it is added in the receiver to the "lows" signal, edges in the signal are properly re-formed. This particular shape is the same as the shape of the "highs" signal associated with an edge in Kretzmer's system, but the amplitude of the entire shaped pulse is coarsely quantized.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 3 is a preferred quantizer transfer characteristic at a transmitter;

Figure 6:
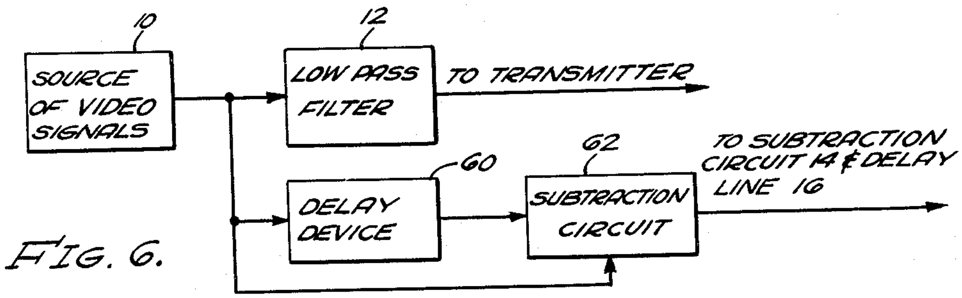
Figure 7:
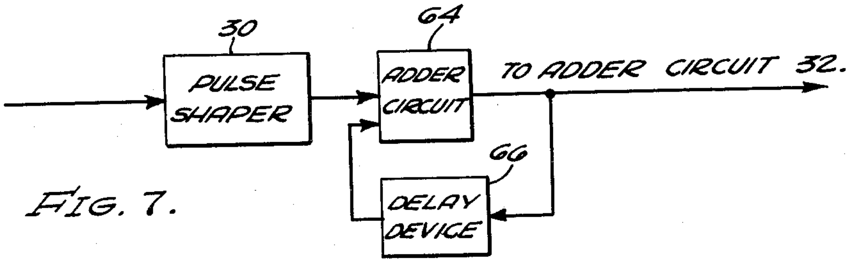
Figure 8:
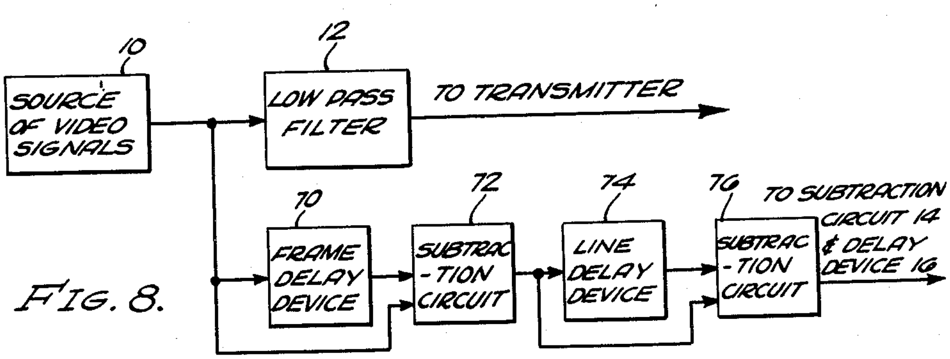
Figure 9:
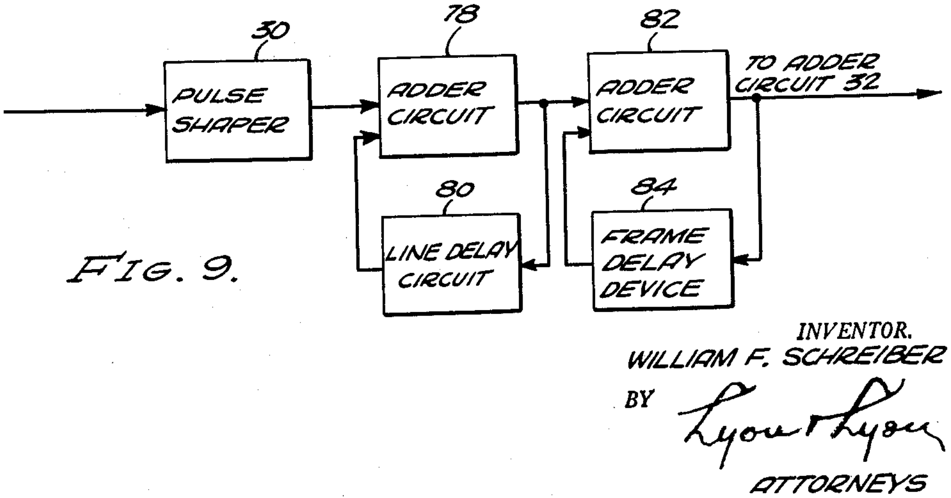

FIGURE 4 comprises wave shape diagrams which are shown in order to provide a better understanding of the operation of this invention at a receiver;

FIGURE 5 illustrates an arrangement at a receiver for obtaining proper pulse shapes for replacing edges in the video signal being reproduced;

FIGURE 6 is a block diagram of further apparatus at the transmitter for further bandwidth savings;

FIGURE 7 is a block diagram of the required apparatus for modifying the receiver;

FIGURE 8 is a block diagram of further apparatus at the transmitter for still further bandwidth savings; and FIGURE 9 is a block diagram of the required apparatus for modifying the receiver.

Figure 1:
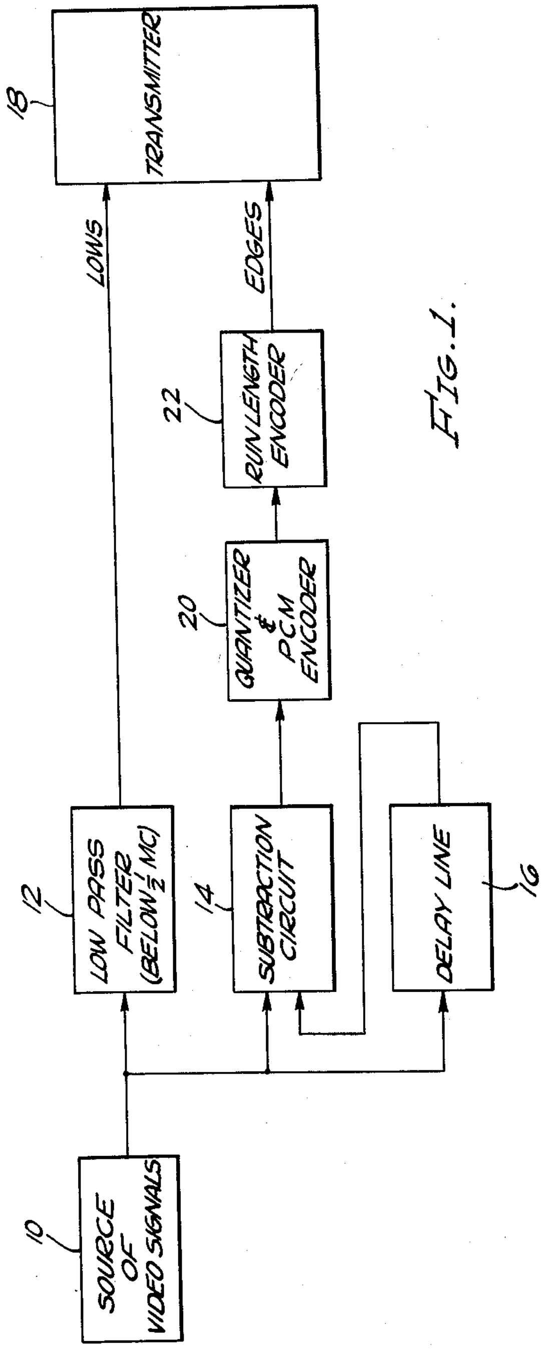
FIGURE 1 is a block diagram of a structure required to modify a transmitter in accordance with this invention.

Referring now to FIGURE 1, a source of video signals 10 is representative of the signal output of a television camera, for example. Signals from this source are applied to a low-pass filter 12, to a subtraction circuit 14, and to a delay line 16. The low-pass filter will pass the portion of the video signal which, for example, is below 0.5 megacycle and which is hereafter designated as the continuous tone "lows" signal. This signal may be directly applied to the transmitter 18 for modulation upon a carrier and transmission in the usual manner, or, if desired, it may be digitalized and transmitted using the pulse-code modulation arrangement as described in the previously mentioned article by Kretzmer.

The output of the delay line 16 is applied to the subtraction circuit 14, which may be a difference amplifier, for example, and which operates to provide as its output a difference signal. The delay time for the delay line is preferably on the order of one-eighth microsecond, so that the difference signal is actually the difference between adjacent "cells" in the video picture. The output of the subtraction circuit 14, consisting of difference signals, is thereafter applied to a quantizer and pulse-code modulation encoder 20. The arrangement for quantizing and pulse-code modulation is well known, being described and shown, for example, in an article "Television by Pulse Code Modulation," Bell System Technical Journal, vol. 30, pp. 39–49, January 1951.

In accordance with this invention, a coarse quantization of a particular type is used. FIGURE 3 shows the proposed transfer characteristic of the quantizer. The steps of quantization are represented by curve 21. It will be seen that the first step of quantization is made larger than the noise level so that noise cannot trigger a spurious step. It will also be seen by considering the curve 21 that as the amplitude of the signal to be transmitted increases, the steps are made larger. The effect of this type of coarse quantization improves the rendition of edges in the final picture, over what would be otherwise obtained with the same number of quantum steps.

Referring back to FIGURE 1, the digitalized output of the pulse-code modulation encoder 20 will consist of a sequence of binary numbers, each of which comprises a plurality of binary bits, one of which represents whether or not the quantized signal was positive or negative and the remaining bits represent the amplitude of the quantized signal. These numbers occur at a clockpulse rate of 8 megacycles for a standard 4-megacycles bandwidth signal, and will differ from zero only when the amplitude of the difference signal being quantized is larger than the first quantum step. The output of the pulse-code modulation encoder, consisting of these binary numbers, is then applied to a run-length encoder 22.

An arrangement for performing the operation of run-length encoding and decoding is described and claimed in an application by this inventor and George T. Inouye, for a Bandwidth Reduction System, Serial No. 613,234, filed October 1, 1956, now Patent No. 2,963,551, granted December 6, 1960. A run-length encoding system comprises an arrangement wherein the binary numbers which are emitted from the pulse-code modulation system are replaced by associated first and second numbers. As applied in this invention, the first number will be the pulse-code modulation encoder output of the previous paragraph, and the second number represents the length of time measured in clock pulses or cells, between successive nonzero quantized difference signals.

Alternatively explained, the pulse-code modulation encoder will provide binary numbers at regular intervals which represent the amplitude level of the signal which was applied to the input. It is well known that video signals contain a great amount of redundancy. Accordingly, the level of the picture may not change for large intervals of time. As a result, the output of the pulse-code modulation encoder will be equal to zero over a considerable interval. For this interval, there may be substituted instead an associated second number. A run-length encoder includes a counter or interval-measuring device which is started by a first of these binary numbers. The interval of time which elapses until a second nonzero pulse-code modulation output number value occurs is detected. At this time, a number representing the corresponding elapsed count or time interval is read out of the counter. This is the previously mentioned second number. The first and second number are then stored in a suitable storage means, since they are received at an asynchronous rate. The storage means will contain the first and second numbers properly segregated for reproducing the lines and fields of the television picture. These first and second numbers may then be read out of memory for transmission by the transmitter 18 at a rate suitable for association with the low-frequency signals. The low-frequency continuous-tone signals, whether or not digitally represented, and the digitally represented difference signals may be transmitted or separate carriers, or may be modulated on separate subcarriers which, in turn, are modulated on a carrier.

Figure 2:
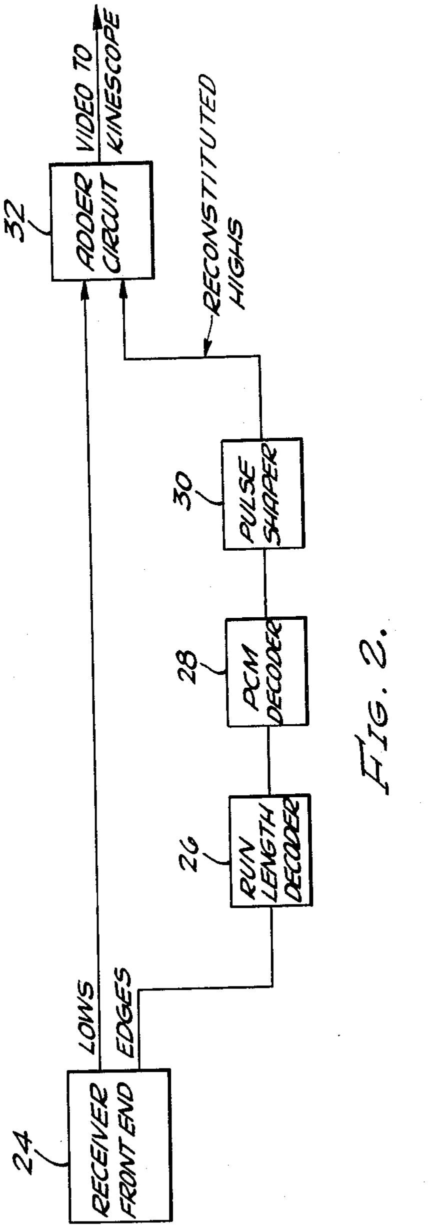
FIGURE 2 is a block diagram of a structure required at a receiver in accordance with this invention.

FIGURE 2 is a block diagram of an apparatus required at a receiver in order to re-form the received continuous tone "lows" signal, as well as the first and second numbers representative of edges in the signal into the original video signal. The receiver front end 24 will include the required RF and IF stages, as well as means for providing in separate outputs the low-frequency signals and the edge signals represented by associated first and second numbers. The associated first and second numbers are applied to a run-length decoder 26 which contains means for storing the received first and second numbers. Means are also included for reading out the first and second numbers in the same asynchronous manner as they were entered into the storage means at the receiver. This includes means to read out a first and second number and a counter to establish a time interval indicated by the second number. Meanwhile, the first number is applied to a pulse-code modulation decoder 28, the output of which is the reconstituted cell-to-cell difference signal. At the end of each interval dictated by the second number, the next associated first and second numbers are read out of the storage means.

The first numbers are applied to pulse-code modulation decoder 28 which will recreate, in wellknown fashion, from the binary numbers applied to its input, voltages having the amplitude levels designated. The output of the pulse-code modulation decoder here will be difference signals, which must then be added to the low-frequency signals in order to recreate the video signal. It has been found, however, that these difference signals, when added to the low-frequency signals without further modification, provide poor edge signals with corresponding degradation of the video. Therefore, the output of the pulse-code modulation decoder 28 is applied to a pulse shaper 30, the function of which is to shape the difference signals so that when they are added by the subsequent adder circuit 32 to the low-frequency signals, the edges of the video signal will be properly recreated.

FIGURE 4 is a wave shape diagram shown to assist in an understanding of this invention. The wave shape 40 in FIGURE 4 represents the original video signal. When this is passed through the low-pass filter 12 in the transmitter, a resultant wave shape 42 is derived. A difference signal 44 is obtained in the output of the subtraction circuit. This difference signal is then digitalized and applied to the run-length encoder for conversion to associated first and second binary numbers. At the receiver, the low-frequency signal 42 is applied to the adder circuit 32 and the difference signals are reconstituted by operation of the run-length decoder and the pulse-code modulation decoder. However, these difference signals, if directly added to the "lows" signals without proper shaping, do not provide as a result a video signal such as represented by the wave shape 40, in that the edges of this video signal will not be properly recreated. It has been found that the wave shape 46 has the characteristic which, when added to the "lows" signal, will properly recreate the edges of the original video signal.

Different types of apparatus may be employed for providing the desired pulse shape and thus may be represented by the pulse shaper 30. One such is to use a tapped delay line having a plurality of taps which are given different weights. The outputs from the various taps are then added. A preferred arrangement for the pulse shaper 30 is shown in FIGURE 5. This will include an integrating circuit 48, to which the output of the pulse-code modulation decoder 28 is applied. The output of the integrating circuit is applied to a low-pass filter 50 and through an equalizing delay circuit 51 to one input of a subtraction or differencing circuit 52. The output of the low-pass filter is applied to the subtraction circuit to be subtracted from the output of the integrating circuit. The output of the subtraction circuit will be the required shaped pulses. The wave shapes shown in FIGURE 5 represent the respective outputs of the circuits in response to the inputs shown. The delay circuit 51 is necessary to compensate for the inherent delay in the low-pass filter. It should be noted that when the "lows" and reconstituted "highs" are added at the receiver, it may be necessary to insert a fixed delay in one of the signals, so that the relative timing will be correct. The exact delay depends on the details, or relative delays, of the circuits used in the two channels.

The system described herein, rather than degrading the picture, provides a sharper and cleaner picture when the signal is reproduced on a kinescope than that obtained when the original video signal is directly reproduced on a kinescope in the ordinary manner. The reason is that the type of quantization employed in the pulse-code modulator eliminates the effect of noise, and the shaped pulses, when added to the "lows" signal, actually provide better edges than are obtained in the video-signal receiver. The novel system described herein, although actually capable of providing a fourfold bandwidth reduction factor, makes available a commercially acceptable television picture.

FIGURE 6 is a block diagram of an arrangement for enabling the obtention of even greater bandwidth reduction, using differencing techniques at the transmitter in combination with the apparatus previously described. This requires the insertion of differencing apparatus between the source of video signals 10 and the subtraction circuit 14 and delay line 16. As shown in FIGURE 6, the differencing apparatus includes a delay device 60 and a subtraction circuit 62. The video signals from the source 10 are applied to the low-pass filter as well as to the delay device 60 and the subtraction circuit 62. The subtraction circuit also has applied thereto output from the delay device 60. The subtraction-circuit output, consisting of the difference between its two inputs, is then applied to the subtraction circuit 14 and delay line 16 to be processed in the manner previously described.

The delay device 60 may be any suitable known type of storage device, such as a Graphechon tube. The subtraction circuit may be any suitable circuitry for opposing two inputs and providing the difference as the output, such as a differencing amplifier. The delay device 60 may provide a line-to-line delay on the order of 63.5 microseconds, whereupon the output of the subtraction circuit 62 consists of only changes in lines. This requires the delay device to have a storage capacity sufficient to enable one line to be entered while the previously entered line is being read out. Alternatively, the delay device may have a frame-to-frame delay on the order of $\frac{1}{30}$ second. The output of the subtraction circuit in this instance will be the difference between frames and the delay device must have a sufficient storage to enter a frame while the previously stored frame is being read out.

FIGURE 7 shows the additional apparatus required at a receiver in accordance with this invention when the apparatus shown in FIGURE 6 is used at the transmitter. This additional apparatus is inserted between the pulse shaper 30 and the adder circuit 32. It effectively performs an integrating function and includes an adder circuit 64 and a delay device 66. The pulse-shaper output is applied to one input of the adder circuit. The adder-circuit output is applied to the following adder circuit 32 and also to a delay device 66. The delay device 66 may be identical to the delay device 60 and must provide the same delay. Thus, the loop including the adder circuit 64 and delay device 66 will circulate old information until new information is obtained which is inserted into the loop by the pulse shaper 30 to modify the old information.

FIGURES 8 and 9 are block diagrams of modifications, respectively, at the transmitter shown in FIGURE 1 and receiver shown in FIGURE 2 for reducing the required bandwidth for signal transmission still further by reducing the number of runs required of the run-length encoder. There is shown in FIGURE 8 a double differencing wherein the output of the video signal source 10 is applied to a frame delay device 70 ($\frac{1}{30}$ second) and also to a subtraction circuit 72 which also receives the output of the frame delay device—the previously stored frame signals. The frame-to-frame difference signals are applied from the subtraction circuit 72 to a line delay device 74 and a subtraction circuit 76. The subtraction circuit 76 will provide as its output line-to-line difference signals. These are applied to the subsequent subtraction circuit 14 and delay device 16.

The arrangement shown in FIGURE 8 takes advantage of which of the two differences provides the greatest bandwidth reduction. Thus, for example, a still picture wherein the line-to-line changes are large will provide the best results when frame-to-frame differences are taken. A moving picture with very little line-to-line changes can provide best results where line-to-line differences are taken.

The receiver modification arrangement in FIGURE 9 requires a double integration process. The output of the pulse shaper 30 is applied to an adder circuit 78. The adder circuit output is applied to a line delay device 80 and to another adder circuit 82. The output of the line delay device 80 is combined with the pulse shaper input by the adder circuit 78. The adder circuit 82 applies output to the frame delay device 84 and to the subsequent adder circuit 32. The frame delay device output is added to the adder circuit 78 output by the adder circuit 82. The receiver then operates as described for FIGURE 2 on the output of the adder circuit 82.

There has accordingly been described and shown herein a novel, useful, and improved arrangement for transmitting and receiving signals having redundant characteristics, wherein the bandwidth of the channel required for transmission is considerably reduced.

I claim:

1. A system for reducing the information required for transmitting signals having video signal characteristics, said signals including continuous-tone low-frequency portions, said system comprising at a transmitter, means to filter the continuous-tone low-frequency portions from said signals, means to transmit said low-frequency portions of said signals, means for subtracting presently existing signals from signals existing at a predetermined previous interval to obtain difference signals, means for quantizing said difference signals and representing them as periodically occurring binary numbers representative of said difference-signal amplitude levels, means for representing said periodically recurrent binary numbers by associated first and second numbers wherein a first number is one of said periodically occurring binary numbers not having a zero value and an associated second number indicating the length of the interval between successive such nonzero first numbers, means for transmitting said associated first and second numbers, means for receiving said low-frequency portions of said signals and said associated first and second numbers, means for reconstituting said associated first and second numbers as difference signals, means for producing shaped-edge pulses from said difference signals, and means for adding said shaped-edge pulses to said low-frequency portions of said signals to recreate said original signals.

2. A system for reducing the information required for transmitting signals having video signal characteristics, said signals including continuous-tone low-frequency portions, said system comprising at a transmitter filter means for separating the continuous-tone low-frequency portions from said signals, means to transmit said low-frequency portions of said signals, means for subtracting presently existing signals from signals existing at a predetermined previous interval to obtain difference signals, means for quantizing said difference signals and representing the different quantized signal levels by different binary numbers the difference in steps of quantization being greater for larger difference signals than for smaller difference signals, means for representing said quantized difference signals as associated first and second numbers wherein said first number is a number representing a level of a difference signal other than zero and said associated second number is representative of the interval between successive such nonzero first numbers, means for transmitting said associated first and second numbers, means for receiving said low-frequency portions of said signals and said associated first and second numbers, means for reconstituting said associated first and second signals as difference signals, means to integrate said difference signals, a low-pass filter to which output from said means to integrate is applied, means for subtracting the output of said low-pass filter from the delayed input to said low-pass filter, and means to add the output of said means for subtracting to said continuous-tone low-frequency portions of said signal to recreate said original signals.

3. A system for reducing the bandwidth required for transmitting video signals, said signals including continuous-tone low-frequency portions, said system comprising filter means for separating the continuous-tone low-frequency portions from said signals, means to transmit said low-frequency portions of said signals, means for subtracting presently existing signals from signals existing at a predetermined previous interval to obtain difference signals, means for quantizing said difference signals and representing the different quantized signal levels by different binary numbers, the difference in steps of quantization being greater for larger difference signals than for smaller difference signals, means for representing said quantized difference signals as associated first and second numbers wherein said first number is a number representing a level of a difference signal other than zero and said associated second number is representative of the interval between successive such nonzero numbers, and means for transmitting said associated first and second numbers.

4. A receiver for video signals which have been transmitted partly on one channel as the continuous-tone low-frequency portions of said video signals and the remainder upon another channel as associated first and second numbers each respectively representative of the amplitude level of a difference signal other than zero and of the length of time between successive such nonzero first numbers, said difference signals being derived from the original video signal by subtracting from later occurring video signals previously occurring video signals, said receiver comprising means for reconstituting said difference signals from said associated first and second numbers, a pulse shaper to which said reconstituted difference signals are applied, said pulse shaper including an integrator circuit, a low-pass filter circuit, means to apply the integrator-circuit output to said low-pass filter, means to subtract said low-pass filter circuit output from said integrator output to obtain shaped pulses, and means to add said shaped pulses to said continuous-tone low-frequency portions of said video signal to recreate said original video signals.

5. In a system for reducing the bandwidth required for transmitting video signals by separating said signals into continuous-tone low-frequency signals and high-frequency signals and thereafter separately digitalizing and transmitting said portions, the improvement in transmitting said high-frequency signals comprising means for deriving difference signals from said video signals, a pulse-code modulation encoder including means for quantizing said difference signals with increasing steps for larger amplitudes, means for applying said difference signals to said pulse-code modulation encoder, and means for transmitting the output of said pulse-code modulation encoder.

6. In a system for reducing the bandwidth required for transmitting video signals by separating said signals into continuous-tone low-frequency signals and high-frequency signals and thereafter separately digitalizing and transmitting said portions, the improvement in transmitting said high-frequency signals comprising means for deriving difference signals from said video signals, a pulse-code modulation encoder including means for quantizing said difference signals with increasing steps for larger amplitudes, means for applying said difference signals to said pulse-code modulation encoder, a run-length encoder, means for applying the output of said pulse-code modulation encoder to said run-length encoder, and means for transmitting the output of said run-length encoder.

7. In a system for reducing the bandwidth required for video signals as recited in claim 6 wherein said means for deriving difference signals from said video signals includes a first means for deriving a difference between video signals representative of different picture lines, and a second means to which said first means output is applied for deriving a difference between video signals representative of different picture elements.

8. In a system for reducing the bandwidth required for video signals as recited in claim 6 wherein said means for deriving difference signals from said video signals includes a first means for deriving differences between video signals representative of different picture frames, and a second means to which said first means output is applied for deriving a difference between video signals representative of different picture elements.

9. In a system for reducing the bandwidth required for video signals as recited in claim 6 wherein said means for deriving difference signals from said video signals includes a first means for deriving a difference between video signals representative of different picture frames, a second means to which said first means output is applied for deriving a difference between video signals representative of different picture lines, and a third means to which said second means output is applied for deriving a difference between video signals representative of different picture elements.

10. A receiver for video signals which have been transmitted in two portions one of which comprises the continuous-tone low-frequency portions of said video signals, the other of which comprises first and associated second numbers, each said first number representing a quantized value of a difference signal and each said associated second number representing the length of the interval elapsing between successive nonzero first numbers, said receiver including means for receiving said continuous-tone low-frequency portions of said video signals and said associated first and second numbers, means for reconstituting said associated first and second numbers as difference signals, means for producing shaped-edge pulses from said difference signals, and means for adding said shaped-edge pulses to said low-frequency portions of said video signals to recreate said original video signals.

11. A receiver for video signals which have been transmitted in two portions one of which comprises the continuous-tone low-frequency portions of said videto signals, the other of which comprises first and associated second numbers, each said first number representing a quantized value of a difference signal and each said associated second number representing the length of the interval elapsing between successive nonzero first numbers, said receiver including means for receiving said continuous-tone low-frequency portions of said video signals and said associated first and second numbers, means for reconstituting said associated first and second numbers as difference signals, means to integrate said difference signals, a low-pass filter to which output from said means to integrate is applied, means for subtracting the output of said low-pass filter from the delayed input to said low-pass filter, and means to add the output of said means for subtracting to said continuous-tone low-frequency portions of said video signals to recreate said original signals.

12. A receiver for video signals which have been transmitted in two portions one of which comprises the continuous-tone low-frequency portions of said video signals, the other of which comprises first and associated second numbers, each said first number representing a quantized value of a difference signal and each said associated second number representing the length of the interval elapsing between successive nonzero first numbers, said receiver including means for receiving said continuous-tone low-frequency portions of said video signals and said associated first and second numbers, means for reconstituting said associated first and second numbers as difference signals, means for producing shaped-edge pulses from said difference signals, an adder circuit having two inputs and an output, means to apply said shaped-edge pulse signals to one of said adder circuit input, means including a delay device for coupling said adder circuit output to said adder circuit other input, and means for adding said adder circuit output to said low-frequency portion of said video signals to recreate said original video signals.

13. A receiver for video signals as recited in claim 10 wherein said delay device provides a delay equivalent to the interval between different lines of video signals.

14. A receiver for video signals as recited in claim 10 wherein said delay device provides a delay equivalent to the interval between different frames of video signals.

15. A receiver for video signals which have been transmitted in two portions one of which comprises the continuous-tone low-frequency portions of said video signals, the other of which comprises first and associated second numbers, each said first number representing a quantized value of a difference signal and each said associated second number representing the length of the interval elapsing between successive nonzero first numbers, said receiver including means for receiving said continuous-tone low-frequency portions of said video signals and said associated first and second numbers, means for reconstituting said associated first and second numbers as difference signals, means for producing shaped-edge pulses from said difference signals, a first adder circuit having two inputs and an output, means to apply said shaped-edge pulse signals to one of said first adder circuit inputs, a means including a first delay device coupled between said first adder output and its other input, said first delay device having a delay on the order of the interval between different lines of video signals, a second adder circuit having two inputs and an output, means to apply said first adder output to one of said second adder inputs, means including a second delay device coupled between said second adder output and its other input, said second delay device having a delay equivalent to the interval between different frames of video signals, and means for adding said second adder circuit output to said low-frequency portion of said video signals to recreate said original video signals.

References Cited in the file of this patent

UNITED STATES PATENTS

| | | |
|---|---|---|
| 2,617,879 | Sziklai | Nov. 11, 1952 |
| 2,629,010 | Graham | Feb. 17, 1953 |
| 2,685,044 | Morton | July 27, 1954 |
| 2,725,425 | Sziklai | Nov. 29, 1955 |
| 2,784,256 | Cherry | Mar. 5, 1957 |
| 2,832,070 | Bateman | Apr. 22, 1958 |
| 2,850,574 | Kretzmer | Sept. 2, 1958 |
| 2,851,522 | Hollywood | Sept. 9, 1958 |
| 2,889,409 | Carbrey | June 2, 1959 |
| 2,920,141 | Jensen | Jan. 5, 1960 |
| 2,946,851 | Kretzmer | July 26, 1960 |